United States Patent [19]

Barrett et al.

[11] 4,419,245

[45] Dec. 6, 1983

[54] COPOLYMER PROCESS AND PRODUCT THEREFROM CONSISTING OF CROSSLINKED SEED BEAD SWOLLEN BY STYRENE MONOMER

[75] Inventors: James H. Barrett, Feasterville; Thomas J. Howell, Langhorne; George M. Lein, Jr., Doylestown, all of Pa.

[73] Assignee: Rohm and Haas Company, Philadelphia, Pa.

[21] Appl. No.: 393,953

[22] Filed: Jun. 30, 1982

[51] Int. Cl.³ .......................... C08F 2/18; B01J 41/14; B01J 39/20
[52] U.S. Cl. ...................................... 210/681; 521/28; 526/201
[58] Field of Search ............... 526/201; 521/28; 525/1

[56] References Cited

U.S. PATENT DOCUMENTS

| | | | |
|---|---|---|---|
| 3,907,730 | 9/1975 | Jones | 526/201 |
| 3,959,189 | 5/1976 | Kitamori | 521/59 |
| 4,085,169 | 4/1978 | Saito et al. | 521/56 |
| 4,091,054 | 5/1978 | Soito | 525/260 |
| 4,186,120 | 1/1980 | Ugelstad | 524/458 |
| 4,192,921 | 3/1980 | Dales | 521/38 |
| 4,224,415 | 9/1980 | Meitzner et al. | 521/38 |

*Primary Examiner*—Joseph L. Schofer
*Assistant Examiner*—Peter F. Kulkosky
*Attorney, Agent, or Firm*—Louis F. Kline, Jr.

[57] ABSTRACT

A process for the manufacture of crosslinked ion exchange copolymer particles wherein small seed particles are swollen to final size by concurrently feeding monomer and polymerizing the same under controlled suspension conditions and the unique ion exchange particles produced thereby.

23 Claims, 2 Drawing Figures

COPOLYMER PROCESS AND PRODUCT THEREFROM CONSISTING OF CROSSLINKED SEED BEAD SWOLLEN BY STYRENE MONOMER

The present invention relates to a process for the preparation of crosslinked ion exchange copolymer particles by aqueous suspension polymerization of lightly crosslinked seed particles and an improved product resulting therefrom. The invention is particularly suited to the preparation of ethylenic or styrenic-based ion exchange copolymer beads utilizing a seed copolymer which is swollen by imbibition of either a styrenic or an ethylenic monomer or monomer mixture. In one preferred embodiment the monomer or monomer mixture used is fed in the form of an aqueous emulsion to the suspended seed. In another preferred embodiment the seed particles are prescreened to a uniform size resulting in a final product having uniform particle size.

BACKGROUND OF THE INVENTION

Essentially all ion exchange resins are presently produced from crosslinked copolymer particles or "beads" by chemically treating the same to attach or form functional groups therein having a capacity for ion exchange. Thus copolymer beads provide the strong, insoluble and rigid substrate for carrying ion exchange functional groups. From a standpoint of durability and hydraulic characteristics, an ion exchange resin is no better than the crosslinked copolymer from which it is derived. Highly porous copolymer particles without functional groups (herein termed "macroreticular" or "macroporous" polymer) are also useful as adsorbents for removing organic materials from fluid mixtures thereof and are intended to be embraced within the meaning of "ion exchange copolymer particles".

As used herein, the terms "functionalize", "functionalized" or "functionalization" are intended to describe the known prior art of chemically treating an insoluble crosslinked copolymer bead to attach an ion exchange group (functional group) thereto. The copolymer bead serves as the backbone polymer, whereas the ion exchange moiety is the active or "functional" site capable of exchanging ions with a surrounding fluid medium. Of the strongly acidic cation exchange resins, the sulfonic acid resin formed by sulfonating a copolymer (e.g., with sulfuric acid) is perhaps best known in the art. Weakly acidic cation exchange resins are normally derived from crosslinked acrylic copolymers by merely hydrolyzing the copolymer to form carboxylic cation exchange groups. Chloromethylation and amination of styrenic copolymers will result in weakly basic anion resins or strongly basic anion resins. Methods of performing suspension polymerization of ion exchange copolymers and of functionalizing the same to ion exchange resins can be found in prior art and, in particular, reference is made to U.S. Pat. No. 4,224,415, which reference is hereby incorporated herein by reference.

Historically ion exchange copolymers have been formed by a batch process using a kettle reactor for monomer droplet formation and polymerization of an aqueous suspension of said monomer droplets. The monomer droplets are formed and maintained in a suspension by the use of a mechanical agitator in the kettle. As might be expected, mild agitation forms monomer droplets (and eventually copolymer beads) of relatively large size while vigorous agitation yields smaller droplets. In either event, agitation of this type invariably leads to beads having a wide distribution of copolymer particle sizes. Ion exchange resins derived from copolymers of widely differing sizes are, in turn, of widely differing sizes. For many applications the wide distribution of bead sizes is not a major problem. For other applications it is desirable to have uniform bead sizes.

To accommodate those uses where narrow distribution of resin size is preferable, most manufacturers mechanically screen either the copolymer beads or the ultimate ion exchange resins to eliminate "unders" and "overs", that is, fines and oversized beads. Unfortunately, it is difficult with present technology to screen wet beads, and drying of the beads is not otherwise required for most purposes. The loss of product yield is another reason militating against screening resin beads. Accordingly, there is a definite desire for a new commercial process to furnish uniformly sized copolymer beads that can be functionalized to have ion exchange properties.

The prior art discloses several methods of growing larger particles from smaller seed particles. Among these can be found methods for (1) growing styrenic or ethylenic polymer particles by feeding monomers into an aqueous suspension of particles having the same composition, (2) swelling of preformed styrenic polymers or copolymers with liquid monomers (in situ) followed by suspension polymerization of the swollen particles and (3) swelling of minute low molecular weight emulsion particles by imbibition of monomers (and optionally solvents) in the suspension.

Illustrative of the known techniques utilizing seed to grow larger particles under aqueous suspension conditions, is Canadian Pat. No. 890,463. (Sekisui/1972). Specific examples show uncrosslinked polystyrene and styrene/acrylonitrile copolymers used as seed and styrene or styrene/methyl methacrylate as the imbibed monomers. Continuous or intermittent addition of monomers over a three to twelve-hour period is illustrated. The reference also teaches the requirement for an expanding agent (foaming agent). Crosslinked seed is not exemplified.

Further refinements of the process of feeding monomers to a suspended styrenic seed may be found in subsequent patents assigned to Sekisui Kagaku Kogyo Kabushiki Kaisha. Among these are UK No. 1,416,405 (1975); UK No. 1,418,560 (1975); U.S. Pat. No. 3,959,189 (1976); U.S. Pat. No. 4,085,169 (1978); and U.S. Pat. No. 4,091,054 (1978). These later references teach the use of screening techniques for the seed in order to produce a uniform styrenic bead and also variations in the techniques of adding the monomers and the catalyst mixtures. In one of the references (UK No. 1,418,560) the improvement involves placing the catalyst in a separate feed stream from the bulk of the monomer mixture and utilizing a solvent with the catalyst. Seed particles of polyethylene are swelled with styrene in another of the patented processes (U.S. Pat. No. 3,959,189). Although the various Sekisui patents disclose combinations of monomers in both the seed and the monomer mixtures and even allude to the use of crosslinkers, clearly none of the teachings describes a method for producing crosslinked styrenic or ethylenic copolymers utilizing a feed containing substantial amounts of crosslinker (as needed for ion exchange copolymer resins). In the examples of the references either the seed particle is a homopolymer of styrene, ethylene, or the like, or the monomer feed is comprised of a single monovinyl monomer, or both. As will be explained more fully hereinafter, the use of a polyethylenically unsaturated crosslinking monomer, especially in large amounts and highly reactive types (such as divinylbenzene), presents unusual and difficult problems in maintaining a suitable aqueous suspension.

Other techniques for imbibing monomers into a performed suspension of particles include the formation of the so-called "hybrid" resins which are produced when absorbing the monomer mixture into the micropores of a macroreticular resin, thereby forming two discrete phases within a single particle bead (see e.g., U.S. Pat. No. 3,991,017). Unlike the Sekisui technique which comprises the growing of particles to larger size, the hybrid resins largely imbibe the monomers into voids or spaces within the particle as well as into the gel matrix of the particle itself and thereby limited swelling is normally accomplished. In order to imbibe a polyethylenically unsaturated crosslinking agent into a preformed liquid monomer mixture containing a monoethylenically unsaturated monomer and a crosslinker, a very carefully controlled suspension system is required (see U.S. Pat. No. 3,792,029). By this method monomer droplets are formed containing both a styrenic monomer and a crosslinking agent and thereafter an emulsion containing additional crosslinker is fed to the suspension to make up for the loss of the faster reacting crosslinker while balancing the stabilizer amount to prevent beads from agglomerating (coalescing). Although differing from the prior art techniques utilizing an initial suspension of seed particles, the process of the U.S. Pat. No. 3,792,029 patent recognizes many of the problems associated with avoiding a new population of fine particles when feeding monomers during polymerization.

A second group of prior art references teaches methods for imbibing monomers into preformed particles to swell the same, and subsequently polymerizing the swollen particles. U.S. Pat. No. 3,332,890 (1967) is an early reference showing the manufacture of "snake-cage" resins produced by imbibing monomers into a styrenic gel polymer to form a linear polymer within the crosslinked copolymer bead. The process involves soaking crosslinked copolymer beads with a monomer mixture and thereafter suspending and polymerizing the swollen beads. Other typical processes for swelling particles or beads prior to polymerization can be found in Romanian Pat. No. 48091 (1967) and UK Pat. No. 1,116,800 (1968). A variation wherein the monomers soaked into the bead comprise both mono- and divinyl monomers is illustrated in UK Pat. No. 728,508 (1955). A so-called double polymerization process is taught in U.S. Pat. No. 2,960,480 (1960).

In more recent years investigators have shown the feasibility of growing larger particles from a seed under emulsion polymerization conditions. See for example U.S. Pat. Nos. 4,113,687 and 4,186,120 (also European patent application Nos. 3905 and 10,986, as well as UK Pat. No. 1,527,312). By this emulsion process, growth of the particles is propagated by maintaining conditions such that molecular weights of the polymers remain low or by utilizing selected solvents which can swell the particles.

SUMMARY OF THE INVENTION

The object of the present invention is to produce crosslinked copolymers of high mechanical strength and preferably narrow particle size distribution by the gradual addition of monomers to a suspension of seed particles maintained under polymerization conditions.

This process comprises: (a) forming an unprotected agitated suspension of lightly crosslinked styrenic or ethylenic copolymer seed particles in an aqueous phase; (b) feeding to said unprotected seed suspension at least one polyethylenically unsaturated styrenic or ethylenic crosslinking monomer and optimally a monoethylenically unsaturated styrenic or ethylenic monomer, which monomers are imbibed by and swell the seed particles without agglomeration of the particles in the suspension system; (c) continuing the monomer addition to the suspension until the seed particles have imbibed an amount of monomer sufficient to swell the particles to the desired size (but insufficient to stress the particles to a point of fracturing upon subsequent functionalization or to cause particle agglomeration or the growth of a new fines population within the suspension); (d) terminating the polymerization subsequent to the feeding step when the imbibed monomers have been sufficiently polymerized (>95-99% polymerized); and (e) separating the resulting insoluble copolymer particles from the aqueous phase. The term "unprotected" means that the dispersion is largely free of the usual protective colloids. When the copolymer is to be used for ion exchange, the monomer mixture will normally contain mainly a monoethylenically unsaturated monomer (e.g., 98-80%) with the remainder crosslinking monomer. In special applications the monoethylenically unsaturated monomer may be as low as a few percent. As used herein "monomer mixture" is intended to refer to combinations of different monomers whether physically admixed or not during addition to the seed particles.

There are at least three important advantages which may be obtained in accordance with this invention over known prior art batch suspension copolymerization techniques. First, the particle size of the copolymer (and resultant functionalized ion exchange product) may be precisely controlled by the size (and size distribution) of the lightly crosslinked seed and the amount of monomers fed thereto, thus eliminating the need for much of the bead screening required by conventional processes. The second advantage is that large-scale reactors may be utilized effectively because the gradual monomer addition distributes the heat of polymerization over a long period of time (e.g., several hours) with only part of the unreacted monomer charge present at the point of critical heat load; conventional batch polymerizations are difficult to control in large reactors because the entire unreacted monomer charge is present at the point of maximum polymerization rate. And, finally, the resultant ion exchange products prepared by the aforementioned seed process having enhanced physical stability properties, such as friability, resistance to osmotic shock and the like, compared to products from conventional batch copolymerization processes.

The ability to continuously or intermittently feed a fresh monomer to a preformed suspension of seed particles offers flexibility not previously obtainable by the conventional prior art batch kettle process. The ability to control the ratio of initial seed to imbibed monomer in a wide range offers significant economic advantages. Because the rapid exotherm of a batch process is not encountered, the cooling requirements for the kettle are not as stringent as in the past. In addition, agitator requirements are drastically reduced. The agitator is not essential to the formation of the initial dispersion but rather is used only to maintain sufficient motion for imbibition of the monomer droplets into the preformed crosslinked seed. In summary, the process of the invention allows the use of polymerization kettles of far less stringent cooling and agitation requirements and, therefore, of different size configuration than useful heretofore in this particular art.

A batch of copolymer produced by the prior art method can be "fractionated" into various size ranges, and each fraction can be utilized to produce product of a larger ultimate particle size by merely controlling the monomer imbibition step during polymerization.

DETAILED DESCRIPTION

Figure 1:
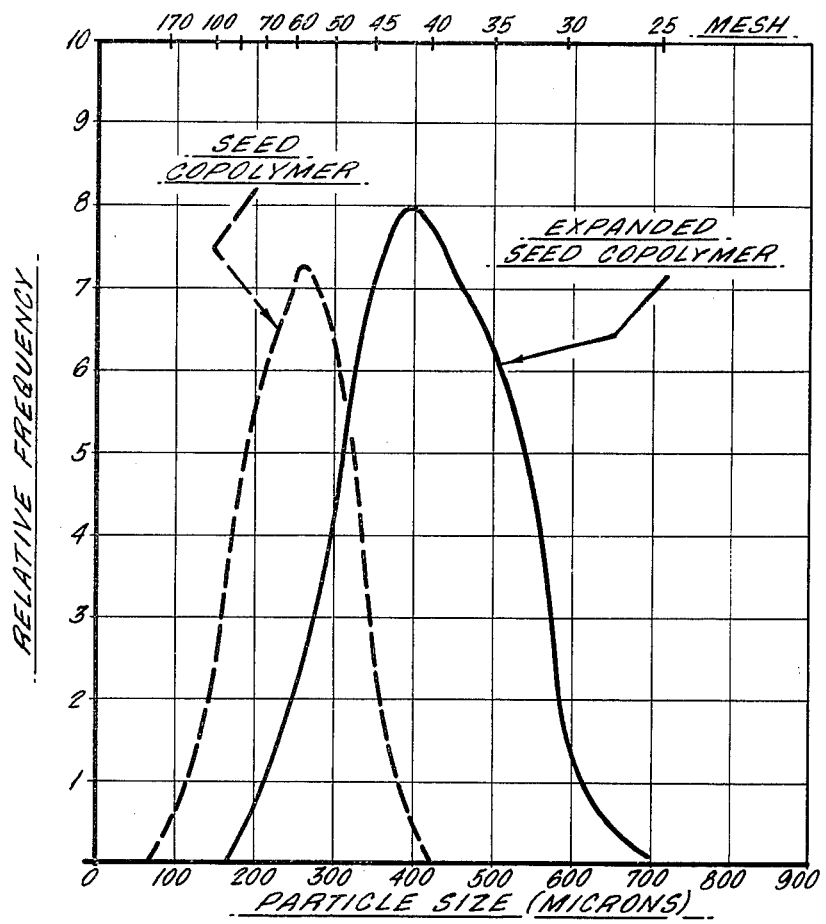
Figure 2:
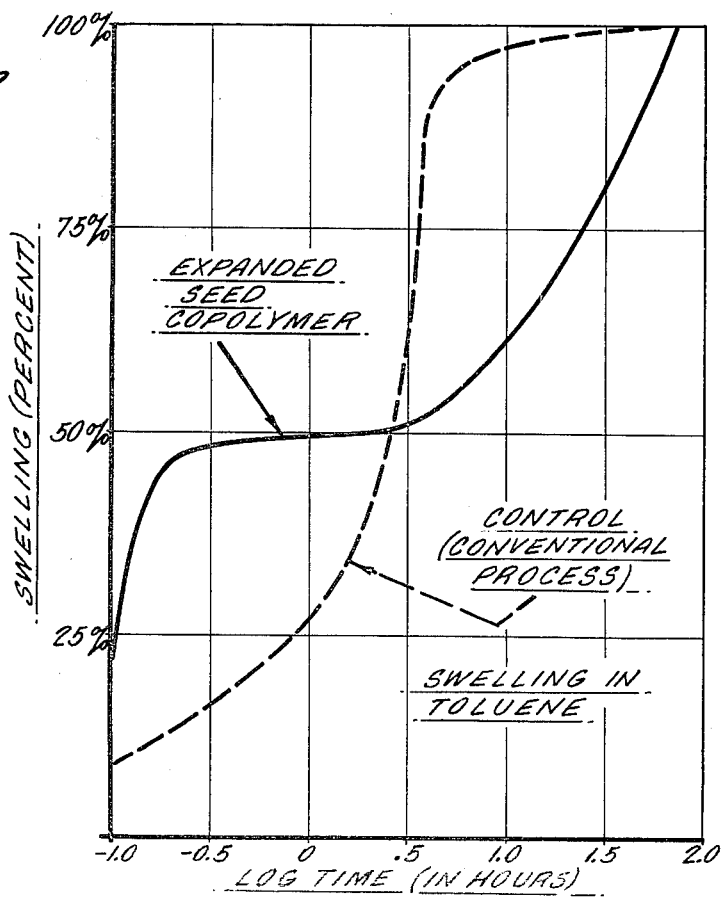

FIGS. 1 and 2 appended hereto illustrate the degree of seed expansion and unique characteristics of the resulting copolymers. Curves representing schematically the distribution of particle sizes of a seed polymer before and after imbibing monomers are shown in FIG. 1. In FIG. 2, the unusually rapid initial swelling characteristics of the swollen (expanded) seed copolymer is shown together with a conventional ion exchange copolymer available heretofore (dashed curve).

The preformed crosslinked seed particles useful in the invention may be styrenic or ethylenic in essential composition, that is, the predominant monomer (the monovinyl monomer in the case of ion exchange particles) will either be styrenic or ethylenic. The crosslinker is a polyethylenically unsaturated monomer which again, may be either styrenic or ethylenic in essential composition; it is possible to imbibe styrenic monomers into ethylenic seed and vice versa. The effective amount of crosslinker used in the lightly crosslinked seed particles must be carefully controlled in order to achieve the degree of swelling required to produce the final product. Experimental evidence indicates that the degree of crosslinking of the seed is an important, if not limiting factor controlling the amount of monomer that can be usefully imbibed within the seed.

The "styrenic" monoethylenically unsaturated monomers contemplated by the invention are those commonly used to produce ion exchange resins and adsorbents, that is, styrene and aliphatic and halogen-substituted styrene. Commercial grades of styrenic monomers may include mixtures of two or more species. Among the monoethylenically unsaturated styrenic monomers useful as styrene, ethylvinyl benzene, vinyl toluene, methyl styrene, vinylbenzylchloride and the various halogenated styrenes, including heterocyclic aromatics such as vinyl pyridine and alkyl-substituted vinyl pyridines.

The "ethylenic" monoethylenically and polyethylenically unsaturated monomers which are suitable for use in the process are principally the acrylates, methacrylates and acrylic acids, acrylamides, methacrylamides, acrylonitriles, and the various vinyl halides and acetates, and mixtures thereof. Illustrative of the class of ethylenic monomers are methyl, ethyl, and butyl acrylate; methyl, ethyl, and butyl methacrylate; acrylonitrile; methacrylonitrile; acrylic and methacrylic acids, dimethylaminopropylmethacrylamide (DMAPMA), trimethylolpropanetrimethacrylate (TMPTMA), vinyl acetate, vinyl chloride, N-vinylpyrrolidone, vinylidene chloride, and the like.

In conjunction with the various monomers mentioned above there may also be used optimally other monoethylenically unsaturated comonomers such as dialkyl maleate, dialkyl fumarates, dialkyl crotonates, dialkyl itaconates, and dialkyl glutaconates.

Suitable polyunsaturated crosslinking monomers include the styrenic and ethylenic crosslinking compounds well-known as useful in the preparation of ion exchange resins. Included within this group are divinylbenzene, divinylpyridine, divinyltoluene, diallyl phthalate, ethylene glycol diacrylate, ethylene glycol dimethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N-methylenedimethacrylamide, N,N-ethylenediacrylamide, trivinylbenzene, and the polyvinyl ethers of glycol, glycerol, pentaerythritol, resorcinol, and the monothio and dithio derivatives of glycols. Particularly preferred crosslinking monomers include aromatic hydrocarbons, such as divinylbenzene and trivinylbenzene, and acrylates such as trimethylolpropanetrimethacrylate (TMPTMA).

Within the above broad classes of monounsaturated and polyunsaturated monomers there may be certain monomers which are not suitable for preparing copolymers which are intended for subsequent functionalization to certain ion exchange resins. To illustrate, certain polyunsaturated crosslinkers may cleave upon sulfonation and accordingly should not be used in making copolymers which are to be converted ultimately to strongly acidic cation exchange resins (by sulfonation). Such crosslinkers, however, may be useful for the preparation of anion exchange resins which are functionalized by chloromethylation and subsequent amination or quaternization. Those skilled in the art will readily understand the parameters for selecting monomers depending upon the ultimate use to be made of the copolymer beads.

The finding that lightly crosslinked seed particles can serve to grow larger particles without undue agglomeration or loss of bead integrity, is an important discovery in accordance with the present invention. The prior art kettle techniques for seed polymerization generally have begun with linear polymers rather than crosslinked polymers and accordingly one might theorize that such technology could be extrapolated to the manufacture of crosslinked ion exchange copolymer beads. Experiments have proved, however, that the starting seed by the present process must be lightly crosslinked in order to avoid dispersion failure when the more reactive crosslinking monomer is added to the dispersion. In general, a crosslinker level of between about 0.1% and 3% by weight of the total copolymer seed is suitable. When using a divinyl crosslinker such as the ubiquitous divinylbenzene (DVB), the crosslinker level is generally 0.1% to 3% by weight, preferably 0.1% to 1.5%, and even more preferably 0.1% to 1% by weight. Polyethylenically unsaturated crosslinkers having 3 or more groups capable of crosslinking normally may be used at a lower level of crosslinker for satisfactory results. To illustrate, when using TMPTMA as a crosslinker, a preferred level would be between 0.1% and 2% by weight. The upper level of 3% for DVB would in most instances be too high for adequate imbibition of monomers. In the case of macroreticular or macroporous seed, higher levels of crosslinker are possible, i.e., 3%, possibly up to about 6.0% by weight. In general, lower levels of crosslinker foster rapid imbibition of the monomer feed but tend to lead to greater "stickiness" of the dispersion and hence increase the possibility of dispersion failure. Higher levels of crosslinker in the seed will tend to limit the overall swelling capacity of the seed and concurrently the rate and capacity for imbibition of the monomer feed.

The unsuitability of a completely uncrosslinked polymer seed in accordance with the prior art method for seed polymerization (e.g., Sekisui, et al) has been demonstrated by repeated experimentation. The following example illustrates an attempt to practice the prior art styrenic seed polymerization in the manufacture of a styrenic ion exchange copolymer. All parts are by weight unless otherwise indicated.

EXAMPLE 1

Reactor

A 2-liter laboratory resin kettle (4"×11") equipped with a dropping funnel, nitrogen inlet, heating mantle, thermocouple, condenser, and agitator was used for all experiments; the agitator had a metal shaft fitted with 6 crossbars (0.5"×2") and a three-bladed pitched impeller at the bottom.

Formulation

Initial runs were meant to evaluate a prior art process with the sole modification being the presence of crosslinker (DVB) in the monomer feed. A brief summary of the formulation follows:

(a) aqueous/organic = 1.2
(b) % DVB in monomer feed = 9.5
(c) monomer/seed weight ratio = 85/15
(d) % TCP (total) in aqueous = 0.5
(e) % BPO in monomer feed = 0.5

Polystyrene seed (−40+50 mesh) was used in all experiments. The abbreviation "TCP" means tricalcium phosphate, a suspension stabilizer. The abbreviation "BPO" means benzoyl peroxide, a polymerization initiator.

A stock TCP slurry was prepared in the following manner:

33 grams TCP were slowly added to 67 ml of deionized water in a blender; additional water was added to increase fluidity until a final TCP concentration of 16% resulted. Thereafter 0.5 ml of an alkyl sulfate surfactant was added with blending for an additional 15 minutes.

Charges for a typical run were:
Styrene: 316 g
DVB (55%): 66 g
BPO: 1.9 g
Polystyrene Seed: 67.5 g
TCP slurry (16%): 2×8.0 g
Deionized Water: 550 g
Alkyl Sulfonate (surfactant): 3 ml

PROCEDURE

The water was added to the reactor, followed by the first TCP charge, and the polystyrene seed. The agitator was set at 490-500 rpm after which the nitrogen sweep was started and the batch heated to 85° C. over 15-30 minutes. The surfactant was then added. Fifteen minutes later the monomer feed containing the initiator was started by dropwise addition using the following schedule:

1st hour: 80 ml
2nd hour 95 ml
3rd hour: 115 ml
4th hour: 134 ml

At the end of the monomer addition, the second TCP charge was added. The batch was then held at 80°-85° C. for 3 hours, followed by a one-hour cure at 95° C. After cooling the batch, 25 ml of concentrated nitric acid ($HNO_3$) was added to dissolve the TCP. The resultant polymer was then washed and dried.

RESULTS AND DISCUSSION

Table I below presents a summary of six experiments involving a crosslinkable monomer feed with polystyrene seed; also included in the table is a control experiment involving no DVB crosslinker; i.e., the standard prior art process for linear polystyrene.

The presence of crosslinker in the monomer feed was responsible for dispersion failure occurring half way through the monomer addition (Experiments 1-3); the "stickiness" of swollen crosslinkable seeds apparently exceeded the protection provided by the TCP stabilizer. Increased amounts of TCP (Experiments 4-5) improved the situation somewhat, but dispersion failure was merely delayed until after the monomer addition; increasing the rate of monomer addition (Experiment 6) was also of no substantial help. Since a control run (Experiment 7) with no crosslinker ran smoothly, it must be concluded that the experimental procedure (equipment, raw materials, etc.) was not at fault but that the TCP/polystyrene seed system is not suitable for this type of crosslinkable monomer feed.

Another important discovery leading to the improved process of this invention is the finding that the seed polymerization is most effectively performed using a suspension system quite unlike those previously used for aqueous suspension of copolymer droplets. In a typical batch kettle process it has been conventional to utilize (1) protective colloids, (2) dispersants, and (3) surfactants. The purpose of the protective colloids is to prevent droplets from coalescing once formed and provide some dispersant characteristics.

TABLE I

| LAB-SCALE POLYMERIZATIONS WITH POLYSTYRENE SEED | | | | | | | |
|---|---|---|---|---|---|---|---|
| Expt. No. | 1 | 2 | 3 | 4 | $5^a$ | $6^b$ | $7^c$ |
| Monomer/Seed ratio | 85/15 | 85/15 | 85/15 | 85/15 | 67/33 | 85/15 | 85/15 |
| TCP Slurry (g): | | | | | | | |
| (a) initial | 8 | 8 | $8^d$ | $13^d$ | $13^d$ | $13^d$ | $9^d$ |
| (b) during feed | — | — | — | 3 × 4.5 | — | 2 × 9 | — |
| (c) after feed | — | — | — | 9 | — | — | 9 |
| Polym. Temp. (°C.) | 80 | 85 | 80 | 80 | 80 | 80 | 80 |
| Dispersion Failure | 50 | 40 | 50 | During | During | 50 | None |
| (% monomer added) | | | | 80° hold | 80° hold | | |

$^a$Only 191 g. of monomer mix used; 2-hr. addition.
$^b$Monomer feed rate increased by 50%.
$^c$Control: no DVB in feed (all-styrene). $^d$Slurry subjected to sonic bath before charging.

Illustrative of the commonly used protective colloids are film-forming polymeric materials such as gelatin, polyvinyl alcohol, and various cellulosics. Dispersants are normally used in an aqueous suspension to promote the formation of new droplets and reduce the power input required by the agitator to form droplet population. Such dispersants are usually not emulsifiers. Polymeric materials such as PADMAC and Acrysols are conventionally used as dispersants. The purpose of a surfactant (emulsifier) is to emulsify the particles and accordingly is more typically a necessary additive for emulsion polymerization rather than suspension polymerization. The surfactants which are most frequently used include soaps and low molecular weight detergents such as those sold under the Triton brand (trademark of Rohm and Haas Company), and other materials well known to the emulsion polymerization art.

Protective colloids are to be minimized or avoided by the present invention because they tend to prevent the seed from imbibing the monomer feed during polymerization. Although dispersants are generally not needed for the present process, they may be used, especially under circumstances where the monomer feed is not in an emulsion form. Where an emulsion monomer feed is used, and such is a preferred embodiment of the invention, it is essential that a surfactant be utilized in the feed and preferably also in the initial suspension.

Among the specific surfactants which may be used to prevent sticking during feeding of the monomer are: sodium lauryl sulfate, sodium dodecyl benzene sulfonates, Triton X405 or 100, saponified coconut or tallow fatty acids and any other soaps normally used for emulsion polymerization. For a nonemulsified feed, calcium phosphates and other conventional prior art stabilizers may also be used.

In the prior art seed process for manufacturing polystyrene beads, inorganic stabilizers such as tricalcium phosphate are customarily used. Because of the stickiness encountered in the systems using a polyvinyl crosslinking monomer, tricalcium phosphate has been found to be inadequate in stabilizing the suspension, especially under the low shear conditions used in the present process. In combination with other more effective stabilizers, however, tricalcium phosphate may have some application to the present process. Protective colloids which form a film about the suspended particles are, on the other hand, so effective at protecting the suspended droplets that they inhibit imbibition of the monomer into the seed and hence cannot be generally used by the present process. By contrast, the prior art aqueous suspension method for making ion exchange copolymer invariably uses a protective colloid to prevent bead agglomeration.

In addition to the monomers, seed particles and suspension stabilizers, it is conventional to add polymerization initiators such as benzoyl peroxide (BPO) to the suspension. A desirable new class of catalysts and rate moderators for polymerization are described in U.S. Pat. Nos. 4,192,921; 4,246,386; and 4,283,499, and are also useful in the process.

Monomer feed to the preformed suspension of seed particles can be accomplished in various ways. The simplest technique is to mix the polyunsaturated crosslinking monomer with the monoethylenically unsaturated monomer (if any) in the desired proportions, together with a minor amount of polymerization initiator, and thereafter feed the monomer mixture dropwise, in a stream, continuously or intermittently. Some alternatives to this procedure include (a) separate feed of the crosslinking monomer and the monoethylenically unsaturated monomer, or (b) separately metered feeding of the two monomers to an in-line mixing device whereby the relative ratios can be varied to accommodate particular desired polymerization conditions, or (c) separately feeding monomers and initiator or initiators. As the prior art suggests, it is sometimes more desirable for bead homogeneity to feed a higher amount of the more reactive polyunsaturated monomer at a later stage of polymerization.

A preferred method for feeding the initiated monounsaturated monomer/crosslinker mixture involves preparing an aqueous solution thereof together with a suitable emulsifier (and optionally other ingredients) and metering this mixture to the suspended seed. Excellent results have been obtained when feeding a pre-emulsified, initiated styrene/DVB mixture containing 0.1–100% DVB to a lightly crosslinked styrenic seed. The emulsified feed containing 1–20% DVB is to be preferred and 2–12% most preferred. In most commercial ion exchange resin copolymers, at least about 2% DVB is the lower limit of acceptability in order to impart the desired strength and durability. We have found, however, that because of the increased homogeneity of the polymers produced by the present seed process, it is possible to use lower levels of crosslinker (as low as 2%) than heretofore utilized commercially to produce a product of equivalent physical properties. Longer periods of addition of monomers to a suspended seed tend to correspond with more effective crosslinking for a given amount of crosslinker added. Thus, for example, a styrenic resin with a given amount of crosslinker added over a two-hour feeding period would not appear to have the same level of crosslinker (under normal testing methods) as a copolymer made by adding the same feed over a five-hour period.

From a standpoint of practical economics of seed polymerization, it has been discovered that the most desirable ratios of monomer feed (monounsaturated monomer plus crosslinker) to the seed is about 2–20:1. Superior products have been produced at monomer feed to seed ratios of 2–20:1, and accordingly, such ratios are to be preferred herein. While a broad range of feed to seed ratios allows for a high level of control of particle size irrespective of the initial seed size, the extreme ends of the range do present more significant problems of controlling the polymerization. When the monomer feed exceeds about 4–5 times the weight of the original seed particles (assuming a typical seed made from 1% DVB crosslinker) the rate at which the seed will absorb new monomer is decreased near the end of the feeding step. Accordingly, at the higher levels of feed it may be necessary to prolong polymerization or accept a higher level of fines in the final product. The fines result from the unwanted polymerization of the emulsion droplets before they can be imbibed by the seed particles.

The type and amount of crosslinker initially used for the seed can also have a bearing upon the quality of the final ion exchange resin derived from the copolymer. Even when agglomeration fails to occur during addition of the monomer feed, the resulting functionalized ion exchange resin produced from such product can have poor physical properties if the seed imbibes more monomer than desirable. For any given monomers used to produce seed and the amounts thereof, the weight of monomer feed that can be imbibed without adverse effect to the final product, must be empirically determined. In general, however, with the preferred crosslinker content of about 0.5% to about 1.5% by weight of the seed, it is possible to add up to 4-5 times the weight of the seed of monomer feed to produce a copolymer which is highly resistant to bead fracture and having very good other physical parameters including solids content and ion exchange capacity.

Monomer can be added to the suspended seed over a period of 2-8 hours, with 3-6 hours being preferred and 3-5 hours most preferred. Suitable reaction temperatures are those conventionally used in the known kettle polymerization process, namely, 30°-90° C. with 70°-90° C. being preferred, it being understood that the 10-hour half-life temperature is a key factor in choosing polymerization temperature. Since the uptake of monomer feed by the seed particles appears to be very rapid, it is possible to add protective colloids to the aqueous phase of the dispersion within about 15 minutes after feeding is complete while polymerization is continuing in the kettle. If a protective colloid is used prior to that time, there is the possibility of creating a new population of small droplets which will appear in the product as fines.

The present seed process is useful for both gellular and porous copolymers using a variation of feed and seed components. Thus, with a crosslinked polystyrene seed a styrene feed can be imbibed without crosslinker being present (at least part of the feed) and later leached out of the crosslinked bead during or after final functionalization. Macroreticular (macroporous) resins are produced using organic solvents with the monomer feed or alternatively adding the solvent to the suspension prior to addition of the monomer feed, or a combination thereof. The general methods for making macroreticular resins are applicable to the present seed process (see, e.g., U.S. Pat. No. 4,224,415).

After all of the monomers are added to the suspended seed, it is desirable to hold the suspension under polymerization conditions (elevated temperature and agitation) for an additional period of time, such as one hour, to complete polymerization. A "chaser" catalyst may be desirable if a low-temperature initiator is used during polymerization and it is desired to finish off the product at an elevated temperature of about 95° C. or higher.

For optimum practical commercial results it is preferable to have as much seed in suspension within the kettle during feeding as possible, short of adversely affecting the suspension or the product. Where there is an excess of seed, poor agitation will result and, in extreme cases, separation of the seed from the aqueous phase may be observed. Normally the seed comprises about 30-40% by weight of the kettle charge with the remainder being the aqueous phase. To maintain a high organic (seed and feed)/water ratio, it may be necessary to add water while concurrently feeding fresh monomer. When an emulsion feed is used, the organic/water balance can be maintained by the composition of the emulsion. An emulsion monomer level as high as 60% is possible; however, a somewhat lower amount such as 50-55% is more desirable for a stable suspension.

Emulsion feed provides the following advantages:
(a) good control of distribution of feed (uniformity)
(b) improved physical contact between feed and seed
(c) reduced agitator power requirements
(d) improved kinetics of pick-up (swelling).

While uniform particle size of the final copolymer product is generally desirable, it is not an essential requirement for a suitable ion exchange product in all situations. Accordingly, it is possible to start the present process using a seed product having a wide distribution of particle sizes with the resultant product having a similar spread of particle sizes, although perhaps somewhat wider than the original seed. Prescreening of the seed particles offers a uniformity of final product sizes not heretofore obtainable directly out of the batch kettle, and accordingly is a dramatic advantage of the present invention.

The following table illustrates specific examples of the growth of seed particles using a monomer feed/seed ratio of 4/1. Copolymer beads were sulfonated to form cation exchange resins with further expansion of size due to the insertion of the sulfonate group. Seed particles were essentially round and sizes given are diameters of beads (in microns).

TABLE II

| Seed Size | | Volume Expanded (4×) Copolymer Size | | Sulfonated Product Size | |
|---|---|---|---|---|---|
| Microns | (Mesh)* | Microns | (Mesh)* | Microns | (Mesh)* |
| 840 | (20) | 1,400 | (14) | 2,000 | (10) |
| 590 | (30) | 1,000 | (18) | 1,450 | (14) |
| 420 | (40) | 720 | (25) | 1,000 | (18) |
| 300 | (50) | 500 | (35) | 720 | (25) |
| 210 | (70) | 360 | (45) | 520 | (35) |
| 150 | (100) | 250 | (60) | 360 | (45) |
| 75 | (200) | 125 | (120) | 180 | (80) |

*U.S. Standard Sieve Size.

Table II above illustrates the range of sizes which would be most typically employed in the seed polymerization technique disclosed herein. Smaller size particles and large size particles can also be utilized as seed with resulting expanded copolymer and resin size.

In those applications where uniformity of the final ion exchange resin product is not essential, it may be possible to prepare the seed particles and the final product in a series of steps performed in the same polymerization kettle. In such a staged growth process a monomer mixture containing crosslinker can first be charged to the kettle, dispersed into droplets by agitation and polymerized, utilizing only a portion of the kettle's capacity. Thereafter, after substantial polymerization of the seed particles, additional monomer can be fed to the kettle and imbibed by the seed. Because the seed is not screened to remove fines and oversized particles, the final product from the kettle has a wide distribution of sizes.

To further illustrate the seed expansion by the present process, reference is made to FIG. 1 appended hereto which is a graph showing the size distribution of a typical seed before expansion and after imbibition of monomers and polymerization. The graph is a qualitative schematic representation of the relative frequency of particle sizes in the indicated range determined by multiple screenings of the seed and expanded seed polymer beads and plotting the relative percentages by weight. The data for the curves were obtained from a suspension-produced seed having a normal distribution of particle sizes including fines and oversized particles.

As might be expected for seed produced in a batch suspension, the distribution curves of FIG. 1 define a "bell" distribution. When the seed was expanded, there was both a shift of the "bell" to larger particle sizes as well as a broadening of the "bell". In this particular instance the monomer feed/seed ratio was 4:1 which calculates to a bead diameter expansion of about 1.7 times the original bead diameter. This accounts for the broadening of the curve upon expansion. Except for a broader range of particle sizes, the expanded seed curve follows the general contour of the seed curve including the flare at either end indicating the presence of both large and fine sizes.

In certain ion exchange resin processes the convenience of uniformly sized particles produced directly in the kettle is highly significant. For example, in chromatagraphic sugar separation applications, resins of the prior art have been very expensive to manufacture because of the large yield losses suffered in screening copolymer in order to satisfy the narrow particle size distribution required (200–500 micron range vs. the 200–1,000 micron range typical of batch process products). The narrow particle size control which can be achieved in the seed process significantly reduces the cost of specialty resins of the aforementioned type resulting in a marketplace advantage.

Perhaps the most important result of the present process is the inherently superior physical properties of the copolymer intermediates and the ion exchange resins and adsorbents which result. Resins made by the seed process have, compared to conventional prior art products, (1) greater mechanical strength, (2) increased resistance to swelling pressures produced within the bead during the acid/base cycling (osmotic shock) test, (3) greater resistance to external forces such as weight of the resin column bed, and (4) high fluid flow capability (condensate polishing applications, etc.). It has been theorized that copolymer morphology plays an important part in physical stability of the resultant ion exchange products. In general, the high DVB reactivity, relative to styrene, leads to very heterogeneous polymer structure in conventional batch polymerizations. Modifications of the process which lead to more homogeneous polymer structure (more even spacing of crosslink sites) are believed to improve the chemical and mechanical stability of the resultant ion exchange products. The gradual addition of the monomer throughout the polymerization of the seed process offsets the effects of DVB reactivity on polymer heterogeneity.

The improved product stability has been demonstrated by visual observation of the percentage of perfect beads after functionalization of the copolymer as well as by standard laboratory tests such as the acid base cycling (microcycling) test and the Chatillon test for resin friability. These laboratory tests are explained in detail hereinafter.

ACID BASE CYCLING (MICROCYCLING) TEST

Microcycling is designed to simulate, on an accelerated time scale, the conditions under which the resin will be used. These studies are conducted over a period of a few days rather than months or years typical of field conditions. Repeated exhaustion-regeneration cycles are performed on the resin at predetermined intervals in a fully automated apparatus.

The resin to be tested is screened and examined under a microscope for appearance before microcycling: four different fields of view of a monolayer of beads are observed and the average result for each of the following is recorded:

(a) % perfect beads
(b) % cracked beads
(c) % fragmented/broken beads

A small portion of the screened resin (0.5 ml) is placed in a sintered glass filter tube such that a monolayer of beads is formed in the tube. This small quantity of resin beads assures good contact between solution and resin and total conversion of the resin during each step. The solutions used for exhaustion and regeneration are made up in advance and stored in 50 liter tanks. The solutions used for anion and cation resins are described below:

| Resin Type | Exhaustion Solution | Regeneration Solution |
| --- | --- | --- |
| Anion | 0.25 N $H_2SO_4$/HCL | 1.0 N NaOH |
| Cation | 0.5 NaOH | 1.0 N HCL |

During a typical experiment, approximately 100–200 ml of exhaustion solution is added dropwise to the resin sample over 10 minutes, followed by removal of bulk exhaustant by mild vacuum, a deionized water rinse followed by mild vacuum, and dropwise addition of regenerant solution over 10 minutes followed by removal of bulk regenerant by mild vacuum and a water rinse; completion of the aforementioned process represents an exhaustion-regeneration cycle and requires approximately 30 minutes. Complete automation allows 100 cycles to be completed in about 48 hours. After completion of 100 cycles (anion 250 cycles), the resin is recovered and inspected microscopically for appearance. The reduction in % perfect bead content is recorded as the breakdown.

CHATILLON TEST FOR RESIN FRIABILITY

The Chatillon test is named for an apparatus manufactured by John Chatillon and Sons, New York, N.Y. and designed to measure resin friability. This instrument (MODEL LTCM, Gauge DPP-2.5KG) measures the force (grams) required to crack or fracture a resin bead when it is placed between two parallel plates. The plates are gradually brought together at a uniform rate until the resin "breakpoint" is reached. The purpose of this test is to simulate the frictional and pressure forces exerted on individual resin beads under actual use conditions.

Specifications for testing include converting the resin into the proper form (hydrogen or sodium for cation resins tested herein and chloride form for anion resins tested herein) by well-known standard procedures. The converted resin is screened and then allowed to fully hydrate in deionized water for at least 15 minutes prior to testing. Actual testing is done on a single resin bead (covered by a small drop of water) in the Chatillon instrument using the lowest practical speed of descent of the crushing plate. The individual fragmentation forces are recorded from the instrument in grams per bead and the results are presented as an average (20 beads minimum, typically 30 beads), a standard deviation, a 95% confidence interval, and the percentage of beads which meet a minimum friability standard.

When produced according to the preferred parameters of the present invention, an ion exchange copolymer results which has exceptionally high physical stability after functionalization. Surprisingly, and contrary to prior beliefs, the preferred copolymer appears to be highly stressed but nevertheless of excellent quality. The stress of the copolymer can be observed under polarized light in an optical microscope following the test procedure for birefringence disclosed in U.S. Pat. No. 4,192,921. A Maltese cross, or some variation thereof, is typically observed in resin strain birefringence patterns and is indicative of spherically symmetric stress orientation. The width and sharpness of the arms of the Maltese cross furnish a qualitative (sometimes quantitative) indication of strain, the sharper, narrower arms indicating higher stress, especially when accompanied by bright areas between arms. An additional unusual characteristic of the preferred copolymer of this invention is that it exhibits non-uniform swelling in a swelling solvent, that is, it initially swells rapidly when placed in a swelling solvent, then decreases (or stops) in swelling rate and later again begins to swell at a rapid rate until swelling is complete. Copolymers produced by the prior art suspension technique essentially swell uniformly until swelling is complete.

The unique non-uniform or two-stage swelling rate of gel copolymers produced by this invention is illustrated in FIG. 2 appended hereto, which is a graph of % copolymer swelling in a solvent to the point of maximum swelling (100% = 1.7 times original volume). Volume increases were determined from a copolymer sample packed in a tube 10 mm in diameter and 113 mm in height. The sample was immersed in the selected solvent and maintained in a water bath at 25° C., with frequent agitation to remove air bubbles. The height of the copolymer in the tube was determined periodically and reported as the ratio of observed height to initial height. The data observed for swelling of a copolymer produced by the present seed process (styrene/6.6% DVB) is plotted in FIG. 2 (identified as "seed"). A control sample (styrene/8.0% DVB) produced by the conventional batch process was subjected to the same solvent and the data plotted in FIG. 2 (identified as "control"). The non-uniform swelling of the seed particles is easily seen when plotting log time (rather than time) against % swelling.

FIG. 2 shows that, when swollen in toluene, the kinetic data demonstrate dramatic differences between conventional (prior art) copolymers and the copolymers of the invention. In solvents the seed-produced particles swell rapidly to about 50% of their total swelling capacity in less than one hour. By comparison, conventional copolymer requires a much longer period of time to reach the same 50% level. This observation might indicate that the effective crosslinking level in the outer structure of the seed particles is lower than that found in conventional styrenic (8% DVB) resins. Microscopic examination further indicates that the copolymer derived from seed swells conventionally, that is, the particles exhibit a solvent-swollen outer shell and an unswollen core. The unswollen core is apparent under the microscope during the entire induction (relaxation) period where little swelling occurs (horizontal portion of the seed curve). Depending upon the solvent used, the induction period normally lasts 1-6 hours at room temperature.

Other copolymers derived from the seed process, such as the acrylic resins, also demonstrate the two-stage swelling phenomenon. However, with more effective solvents, for example, dichloromethane ($CH_2Cl_2$), more rapid swelling occurs leading to a less prominent induction period in the swelling of the copolymers derived from seed. Conventional resins of various compositions derived from batch kettle processes uniformly exhibit slow initial swelling followed by continuous swelling, without an induction period, until completely swollen. The "control" in FIG. 2 is typical of the conventional resins.

It is believed that the two-stage swelling of the preferred copolymer and the apparent stress in the copolymer bead itself are due to an interpenetrating entangled polymer network created within a swollen seed particle which itself is a separate polymer network. Thus, it is postulated (but not relied upon) that the present preferred seed process involves expansion of the seed to form openings into which the second polymer network penetrates rather than a less preferred shell core structure. The shell/core structure can be formed in copolymer beads, and evidence of this can be seen in the birefringence patterns showing two distinct Maltese crosses, one superimposed on and within the other, within a single bead. Apparently a more highly crosslinked seed is unable to swell sufficiently to imbibe the liquid monomer and, hence, a second bead forms surrounding the seed. By utilizing the lightly crosslinked seed particles of the present invention, however, there is sufficient flexibility of the polymer to allow for either uniform expansion or nominal shell/core configuration.

The process of the present invention is illustrated with copolymers prepared and functionalized in accordance with the following general synthetic methods for both copolymer production and functionalization (sulfonation/cation, amination/anion). The operating conditions for copolymer synthesis and the chemical and physical properties of the functionalized resin produced from the copolymer are summarized below in Table III.

Synthetic Method

Copolymer Synthesis

Procedure

The copolymers were prepared in 1.5-2.0 liter resin kettles (6-8 crossbars with turbine impeller) at 300-400 rpm. The preformed seed charge and a portion of the water/emulsifier charge were added to the reactor and heated to reaction temperature (75°-90° C.) with stirring. The initiated monomer mix was emulsified, stirring as needed, and fed subsurface over a 3-5 hour period. After completion of the monomer feed, the reaction mixture was held at temperature for 30-60 minutes and then heated to 95° C. for a 1-2 hour finish-off. The copolymer beads were then washed and air-dried prior to functionalization.

| Raw Material Charges (typical) | |
|---|---|
| Initial Suspension | |
| Deionized $H_2O$ | 210 g |
| Triton QS-44 (10% active)* | 10 g |
| Seed (screened/preformed) | 64 g |
| Feed Mixture (typical) | |
| Deionized $H_2O$ | 150 g |
| Triton QS-44 (10% active)* | 20 g |
| Styrene monomer | 218 g |
| DVB (55% active) monomer | 38 g |
| Benzoyl Peroxide (initiator/BPO) | 1.8 g |

*pH adjusted to 7.0-7.5/Triton QS-44 is a Rohm and Haas Company trademark for a surfactant.

Sulfonation (Cation exchanger)

Procedure

The air-dried copolymer is sulfonated in a 1-liter, 3-necked, round bottom flask equipped with stirrer, dropping funnel, condenser, and thermometer. Heat is supplied by a heating mantle and regulated by a Thermowatch/potlifter apparatus. The sulfuric acid is charged first, followed by the copolymer, then the EDC. The mixture is heated to 130° C. over a three-hour period with stirring. After being held at 130° C. for one hour, the mixture is cooled to 120° C. and water is added at such a rate to maintain the bulk temperature <125° C. Water is then added rapidly with stirring interspersed with siphoning to remove the buildup of wash liquors until the washes are clear. The hydrated resin is then neutralized with 50% caustic added over 30 minutes followed by 30 minutes stirring. The resin is batch-washed to remove excess caustic and drained to remove excess water.

| Raw Material Charge (typical) | |
|---|---|
| $H_2SO_4$ (96%) | 505 g |
| Copolymer (air-dried) | 100 g |
| Ethylene dichloride (EDC) | 35 g |
| $H_2O$ | |
| (a) hydration | 1500-2000 g |
| (b) neutralization | 1000-1500 g |
| 50% NaOH | 100 g |

Chloromethylation Procedure

One mol of copolymer was swollen with 4 mols of chloromethylmethylether (CME) and then a solution of $AlCl_3$ (0.6-0.8 mol) in CME (75 ml) was added to the stirred mixture over a 2-4 hour period (cooling to maintain 20° C.). The mixture was then held at 20°-25° C. for 2-4 hours after the $AlCl_3$ addition; the excess CME was then destroyed by a water quench while maintaining the temperature below 25° C.

Amination Procedure (Anion exchanger)

One mol of chloromethylated intermediate was slurried with water and the mixture made basic (pH>13) with 50% NaOH. Anhydrous trimethylamine, TMA (1.5mois), was then added through a gas dispersion tube over a 1-2 hour period, cooling to maintain 0°-5° C. Upon completion of the TMA add, the mixture was held near room temperature for 8-12 hours, followed by a heatup to 100° C. to remove excess TMA. The resin was then washed with water and isolated for analysis.

Table III below summarizes a numer of examples conducted by the foregoing methods: various ranges of monomer feed/seed ratio, seed crosslinker (DVB) level, monomer mix crosslinker (DVB) level, seed size, reaction temperature, initiator concentration, and addition time are illustrated. Samples with an asterisk indicate that emulsified monomer mix was used; in the other cases, the monomer mix was added neat.

TABLE III

Procedure for Copolymer Production/Physicl/Chemical Properties of Resins Produced

| | Copolymer Data | | | | | | | Ion Exchange Resin Product Data | | | | |
|---|---|---|---|---|---|---|---|---|---|---|---|---|
| Example No. | Monomer Feed/Seed (Wt. Ratio) | Seed DVB (%) | Cross-linking Monomer In Feed (DVB %) | Seed Size (Mesh) | Polymerization Temp. (°C.) | Initiator (BPO) Conc (%) | Addn. Feed Time (hrs.) | Friability (i) (g/bead) | % Solids (H) | Capacity (meq/g) | Appearance % PB | Cycling Stability (ii) (% Breakdown) |
| 2 | 80/20 | 1.0 | 4.7 | −70+200 | 85 | 0.5 | 3.1 | — | 35.0 | 5.33 | 100 | — |
| 3 | 80/20 | 1.0 | 6.0 | −70+120 | 85 | 0.7 | 3.0 | — | 40.1 | 5.12 | 98 | — |
| 4 | 80/20 | 1.0 | 7.3 | −40+120 | 85 | 0.4 | 3.5 | 1210 | 48.7 | 5.41 | 95 | 2 |
| 5 | 80/20 | 1.0 | 7.3 | −40+120 | 87 | 0.6 | 3.0 | 880 | 46.7 | 4.94 | 98 | — |
| 6 | 80/20 | 1.0 | 7.5 | −40+120 | 86 | 0.2 | 4.0 | 1695 | 44.0 | 5.37 | 99 | — |
| 7 | 80/20 | 1.0 | 7.5 | −40+120 | 90 | 0.2 | 4.0 | 1750 | 45.4 | 5.50 | 93 | — |
| 8 | 80/20 | 1.0 | 8.0 | −45+70 | 83 | 0.55 | 3.0 | — | 44.0 | 5.32 | 98 | 1 |
| 9 | 80/20 | 1.0 | 8.0 | −35+40 | 85 | 0.4 | 3.5 | — | 43.0 | 4.93 | 97 | 1 |
| 10 | 80/20 | 1.0 | 8.0 | −45+70 | 85 | 0.7 | 3.0 | 1228 | 46.0 | 5.35 | 98 | 1 |
| 11 | 80/20 | 1.0 | 8.0 | −45+70 | 85 | 0.7 | 3.0 | 1355 | 45.2 | 5.23 | 98 | 0 |
| 12 | 80/20 | 1.0 | 8.0 | −35+45 | 85 | 0.7 | 3.0 | — | 47.5 | 5.17 | 94 | 0 |
| 13 | 80/20 | 1.0 | 8.0 | −40+120 | 86 | 0.4 | 3.5 | 1022 | 45.8 | 4.92 | 99 | 2 |
| 14 | 80/20 | 1.0 | 8.0 | −45+70 | 87 | 0.55 | 3.0 | — | 46.9 | 5.18 | 98 | 1 |
| 15 | 80/20 | 1.0 | 8.5 | −40+120 | 87 | 0.3 | 4.0 | 1570 | 50.7 | 5.28 | 96 | 2 |
| 16 | 80/20 | 1.0 | 8.5 | −40+120 | 87 | 0.4 | 4.8 | 700 | 51.4 | 5.04 | 94 | 2 |
| 17 | 80/20 | 1.0 | 8.5 | −40+120 | 90 | 0.4 | 3.5 | 550 | 51.8 | 4.91 | 93 | 4 |
| 18 | 80/20 | 1.0 | 10.0 | −40+120 | 81 | 0.4 | 3.5 | 1150 | 46.7 | 5.33 | 99 | 1 |
| 19 | 80/20 | 1.0 | 10.0 | −60+100 | 85 | 0.5 | 3.0 | — | 42.3 | 5.47 | 95 | — |
| 20 | 80/20 | 1.0 | 11.0 | −40+120 | 85 | 0.7 | 3.0 | 1749 | 54.6 | 5.01 | 96 | 0 |
| 21 | 80/20 | 1.0 | 11.0 | −35+45 | 85 | 0.7 | 3.0 | — | 49.9 | 5.23 | 97 | 0 |
| 22 | 85/15 | 1.0 | 7.0 | −40+60 | 85 | 0.7 | 3.1 | 920 | 45.4 | 5.10 | 90 | 1 |
| 23 | 85/15 | 1.0 | 8.0 | −40+100 | 85 | 1.0 | 3.0 | — | 49.3 | 5.11 | 93 | — |
| 24 | 85/15 | 1.0 | 8.0 | −60+100 | 90 | 0.5 | 3.0 | 1234 | 40.7 | 5.25 | 96 | 9 |
| 25 | 85/15 | 1.25 | 7.0 | −40+50 | 80 | 0.5 | 3.0 | — | 39.2 | 5.29 | 90 | 10 |
| 26 | 85/15 | 1.5 | 5.0 | −45+50 | 80 | 0.5 | 3.0 | 966 | 43.6 | 5.17 | 87 | 13 |
| 27 | 85/15 | 1.5 | 5.5 | −40+50 | 80 | 0.5 | 3.0 | — | 39.7 | — | 95 | 5 |
| 28 | 90/10 | 1.0 | 8.0 | −45+60 | 85 | 0.5 | 2.7 | — | 47.9 | 5.09 | 45 | 0 |
| 29 (Anion Resin) | 80/20 | 1.0 | 5.0 | −45+60 | 85 | 0.5 | 2.0 | 1249 | 51.0 | 3.72 | 96 | 6 |
| Control (Typical Anionic) | — | — | — | — | — | — | — | 200-400 | (Cl) (46-52) | (3.9-4.2) | 90-95 | 10-30 |
| Control (Typical Cationic) | — | — | — | — | — | — | — | 500-1000 | 46-50 | 4.9-5.3 | 70-95 | 10-30 |

(i) = Chatillon test
(ii) = Microcycling test

Following the general procedure and apparatus disclosed above under "Synthetic Method", a number of ethylenic copolymers, and mixed styrenic/ethylenic copolymers were prepared. Because the monomers used to form the ethylenic copolymers are normally water-soluble, polymerization inhibitors, such as NaNO₂, are used in the aqueous phase. The high water solubility of certain monomers also may prevent the use of an emulsified feed, the preferred method of feeding liquid styrenic monomers. The composition of the seed, monomers and catalyst together with the feed rate and polymerization conditions of various example polymerizations are summarized in Table IV below:

heated to reaction temperature (85° C.) while applying a nitrogen sweep and stirring as needed. The initiated styrenic monomer mix was emulsified and fed to the kettle reactor over about a 3-hour period. After completion of the monomer feed, the reaction mixture was held at temperature for about 4 to 5 hours (5 hours Example 35, 4 hours Examples 38 and 39) and allowed to cool. The phase extending solvent (MIBC) was then distilled off from the copolymer and the product was water washed and dried to yield opaque beads.

TABLE IV

ETHYLENIC COPOLYMERS

| Example Number | Monomer/ Seed Ratio | Seed DVB (%) | Monomer Mix DVB (%) | Seed Size (MESH) | Addition Time (HRS) | Seed[5] Composition Weight Ratio | Monomer[4,5] Mix Comp Weight Ratio |
|---|---|---|---|---|---|---|---|
| 30[1] | 80/20 | 1.0 | 6.0 | −60 + 100 | 3.0 | 99/1 P(St/DVB) | 89/6/5 (MA/DVB/EVB) |
| 31[2] | 80/20 | 1.0 | 6.0 | −40 + 60 | 2.0 | 49/49/1/1 P(MA/MMA/DVB/EVB) | 87/6/5/2 (MA/DVB/EVB/DEGDVE) |
| 32[2] | 80/20 | 1.0 | 6.0 | −40 + 60 | 2.0 | 98/1/1 P(MMA/DVB/EVB) | 87/6/5/2 (MA/DVB/EVB/DEGDVE) |
| 33[3] | 80/20 | 1.0 | 6.0 | −40 + 60 | 2.0 | 49/49/1/1 P(MA/MMA/DVB/EVB) | 89/6/5 (MA/DVB/EVB) |
| 34[3] | 80/20 | 1.0 | 6.0 | −40 + 60 | 2.0 | 98/1/1 P(MMA/DVB/EVB) | 89/6/5 (MA/DVB/EVB) |

NOTE:
In all cases, monomer mix was added neat, i.e., no emulsification
[1]Kettle aq. Phase contained 1% Triton QS-44 (based on monomer) and 750 PPM N$_a$NO₂ (based on monomer)
[2]Kettle aq. Phase contained 1.2% TCP (tricalcium phosphate) based on monomer; gelatin (0.6% on monomer) was added after monomer addition complete.
[3]Kettle aq. Phase contained 1% TCP (tricalcium phosphate) and 0.5% PADMAC A based on monomer; gelatin (0.4% on monomer) was added after monomer addition complete.
[4]Polymerization conducted using 1% lauroyl peroxide (initiator) at 65°.
[5]"St" = styrene; "DVB" = divinylbenzene; "MA" = methyl acrylate; "MMA" = methyl methacrylate; "EVB" = ethyl vinyl benzene; "DEGDVE" = diethyleneglycol divinylether.

EXAMPLES 35–39

The process of the present invention for the production of macroreticular (porous) copolymers and adsorbents is illustrated in Examples 35–39. In each case the seed and monomer feed materials were all styrenic (i.e., styrene and DVB). In Example 35, 1% crosslinked macroreticular seed particles were employed while in Examples 36–39, 0.1% to 0.5% crosslinked gellular seed particles were used. Porosity was promoted by using a solvent material (MIBC) to cause phase separation of the imbibed monomers according to the known prior art processes. In Examples 35, 38 and 39 the phase extending solvent was added to the reactor with the seed and a portion of the water/emulsifier charge while in Examples 36 and 37 the phase extending solvent was added to the reactor with the monomer mix.

The copolymers were prepared in a 4-necked, 2.0 liter round bottom kettle equipped with a nitrogen inlet, thermometer, reflux condenser and stainless steel paddle stirrer which operated at around 300 rpm. In Examples 35, 38 and 39 the preformed seed particles, a portion of the water/emulsifier charge and phase extending solvent (MIBC) were added to the kettle reactor and heated to reaction temperature (85° C.) while applying a nitrogen sweep and stirring as needed. The initiated monomer mix was emulsified and fed to the kettle reactor over about a 3-hour period. After completion of the monomer feed, the reaction mixture was held at temperature for about 4 to 5 hours (5 hours Example 35, 4 hours Examples 38 and 39) and allowed to cool. The phase extending solvent (MIBC) was then distilled off from the copolymer and the product was water washed and dried to yield opaque beads.

In Examples 36 and 37 the preformed gellular seed particles and a portion of the water/emulsifier charge were added to the kettle reactor and heated to reaction temperature (85° C.) while applying a nitrogen sweep and stirring as needed. The initiated monomer mix and phase extending solvent (MIBC) were emulsified and fed to the kettle reactor over about a 3-hour period. After completion of the monomer feed, the reaction mixture was held at temperature for 4 to 6 hours (6 hours for Example 36 and 4 hours Example 37) and then allowed to cool. The phase extending solvent (MIBC) was then distilled off from the copolymer and the product was water washed and dried to yield opaque beads. The water washes in Examples 35–39 were white indicating an unknown amount of emulsion polymer was formed. The process conditions, porosity and surface area of the final products are summarized in Table V which follows:

TABLE V

Macroreticular Copolymers (Styrenic)

| Example No. | Monomer/ Seed Ratio | Seed DVB (%) | Monomer Mix DVB (%) | Reaction Temp. (°C.) | BPO Conc. (%) | Addn. Time (Hrs.) | Kettle | Monomer Mix | Conc. (% on Monomer) | Porosity (cc/gm) | Surface Area (m²/gm) |
|---|---|---|---|---|---|---|---|---|---|---|---|
| 35 | 80/20 | 1.0[1] | 8.0 | 85 | 0.5 | 2.8 | MIBC[2] | — | 66 | 0.44 | 20 |
| 36 | 80/20 | 0.5 | 8.0 | 85 | 0.25 | 3.0 | — | MIBC | 66 | 0.11 | 5.0 |
| 37 | 80/20 | 0.1 | 25 | 85 | 0.5 | 3.2 | — | MIBC | 66 | 0.65 | 33 |
| 38 | 80/20 | 0.1 | 54.5 | 85 | 0.5 | 3.25 | MIBC | — | 66 | 0.68 | 133 |
| 39 | 80/20 | 0.1 | 80.4 | 85 | 0.5 | 2.8 | MIBC | — | 66 | 0.60 | 83 |

[1]Seed was made with MIBC (100% on monomer).
[2]MIBC = methyl isobutyl carbinol.

We claim:

1. A seed process for manufacturing crosslinked ion exchange copolymer particles capable of withstanding swelling pressures without fracturing upon subsequent functionalization which comprises:

(a) forming an agitated aqueous suspension of polymerized lightly crosslinked styrenic or ethylenic seed particles in the absence of an amount of polymeric protective colloids which would prevent imbibition of monomers into the seed particles;

(b) feeding to said suspended seed particles under polymerization conditions from 2:20 parts by weight of the seed of a monomer or monomer mixture comprising (I) 0 to 98% by weight of said monomer or monomer mixture of at least one monoethylenically unsaturated styrenic or ethylenic monomer and (II) 2–100% by weight of said monomer or monomer mixture of at least one polyethylenically unsaturated styrenic or ethylenic crosslinking monomer, while balancing the suspension conditions, the feed rate, the agitation and the polymerization rate to avoid particle agglomeration and ultimately produce said ion exchange copolymer particles, until the seed particles have swollen to the desired size by imbibition of the monomer or monomer mixture;

(c) continuing polymerization of the swollen seed particles until said ion exchange copolymer particles result; and (d) separating said ion exchange copolymer particles from the aqueous suspension medium.

2. The process of claim 1 wherein the seed particles and monomers are styrenic, said styrenic monomers consisting essentially of one or more of the class including styrene, ethylvinylbenzene, vinyltoluene, methylstyrene, vinylbenzyl chloride, halogenated styrenes, and heterocyclic aromatics such as vinylpyridine and alkyl-substituted vinylpyridines.

3. The process of claim 1 wherein the seed particles and monomers are ethylenic.

4. The process of claim 1 wherein the seed particles are crosslinked polystyrene and the monomers in the feed are predominantly styrene and divinylbenzene, said monomers in the feed mixture comprising 80%–98% by weight of styrene.

5. The process of claim 4 wherein the polystyrene seed is lightly crosslinked with between 0.1 and 1.5% by weight of divinylbenzene.

6. The process of claim 1 wherein the monomers fed to the seed particles comprise between 2 and 10 times the weight of the original seed particles.

7. The process of claim 1 wherein the monomer feed or the aqueous suspension contains a phase-separating amount of an organic material capable of causing phase separation of the polymerizing monomers to produce a substantially macroreticular copolymer.

8. The process of claim 1 wherein the monomers are fed to the suspended seed particles over a period of between about 2 and 5 hours.

9. The process of claim 1 wherein the feed mixture comprises 80–99% by weight of the mixture of at least one monoethylenically unsaturated styrenic or ethylenic monomer and 1–20% by weight of the mixture of at least one polyethylenically unsaturated styrenic or ethylenic crosslinking monomer.

10. The process of claim 1 wherein the monomer feed is emulsified.

11. The process of claim 1 wherein the monomer feed comprises styrene and 2–12% by weight of divinylbenzene.

12. A seed process for manufacturing crosslinked polystyrene particles which comprises (a) forming, in the substantial absence of polymeric protective colloids, an agitated aqueous suspension of crosslinked polystyrene seed particles containing between 0.5% and 1.5% by weight of divinylbenzene crosslinker;

(b) feeding to said suspended seed 2:20 parts by weight of the seed, under polymerization conditions, monomers comprising (I) 88%–98% by weight of styrene and (II) 12%–2% by weight of divinylbenzene over a 3–5 hour period until the ratio of the weight of the monomers fed to the original seed is within the range of 3:1 to 6:1;

(c) continuing polymerization for 1–3 hours to completely polymerize the monomers; and (d) separating the crosslinked polystyrene particles from the suspension.

13. Crosslinked styrenic or ethylenic ion exchange copolymer beads exhibiting two-stage swelling in a polar solvent and having a Maltese cross birefringence pattern under polarized light characteristic of high bead stress.

14. The copolymer beads of claim 13 wherein the polymer is crosslinked polystyrene, the swelling solvent is toluene, and the birefringence pattern is a Maltese cross.

15. Copolymer beads produced by the process of claim 1.

16. Copolymer beads produced by the process of claim 12.

17. Ion exchange resins produced by functionalizing a copolymer produced by the process of claim 1 with an ion exchange functional group.

18. Ion exchange resins produced by functionalizing a copolymer produced by the process of claim 2 with an ion exchange functional group.

19. Ion exchange resins produced by functionalizing a copolymer produced by the process of claim 12 with an ion exchange functional group.

20. Ion exchange resins produced by functionalizing the copolymer beads of claim 13 with an ion exchange functional group.

21. Ion exchange resins produced by functionalizing the polystyrene beads of claim 14 with an ion exchange functional group.

22. A method for removing ions from a fluid medium containing the same which comprises contacting said fluid medium with the ion exchange resin of claim 17.

23. A method for removing ions from a fluid medium containing the same which comprises contacting said fluid medium with an ion exchange resin produced in accordance with the process of claim 4.

* * * * *